J Bradley,
Plough.

N° 74,885. Patented Feb. 25, 1868.

Witnesses-
J. L. Smith
A. L. Heyhman

Inventor-
Jeremy Bradley
Chipman Hosmer & S
attys.

United States Patent Office.

JEREMY BRADLEY, OF OWATONNA, MINNESOTA.

Letters Patent No. 74,885, dated February 25, 1868.

IMPROVEMENT IN PLOUGHS.

The Schedule referred to in these Letters Patent and making part of the same.

TO WHOM IT MAY CONCERN:

Be it known that I, JEREMY BRADLEY, of Owatonna, in the county of Steele, and State of Minnesota, have invented a new and valuable Improvement in Ploughs; and I do hereby declare that the following is a full, clear, and exact description of the construction and operation of the same, reference being had to the annexed drawings, making a part of this specification, and to the letters and figures of reference marked thereon.

The nature of my invention consists in providing an extra plough, with means of attachment, so arranged and constructed that said plough may be easily attached to the plough-beam of an ordinary plough, in the rear thereof, and thereby enable the operator to make a subsoil-plough of a common plough at pleasure.

My plough-attachment is constructed in the form shown on the drawings, in which letter A is the plough, letter B is the standard, and letter C is the clamp by which said standard is attached to the plough-beam.

I usually prefer to use a plough made in the form of a shovel for this attachment, but the shape is not very material.

Figure 1:
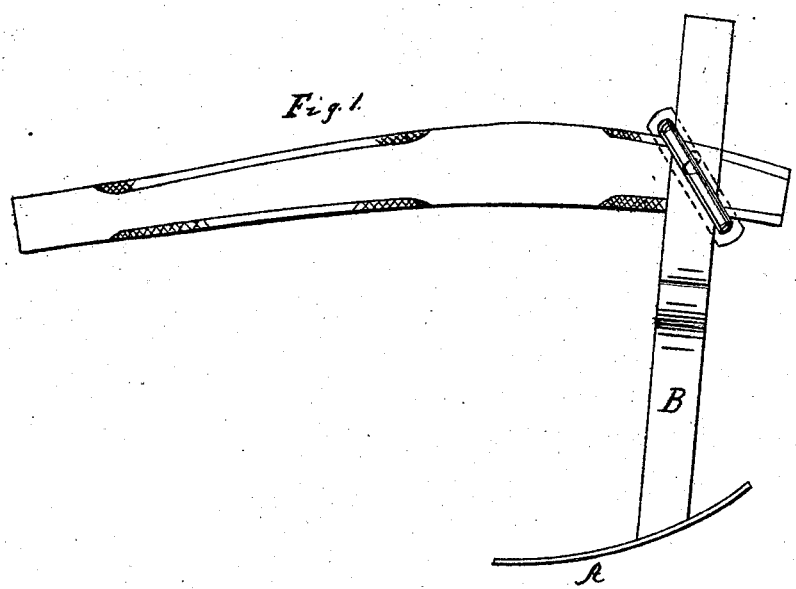
Figure 2:
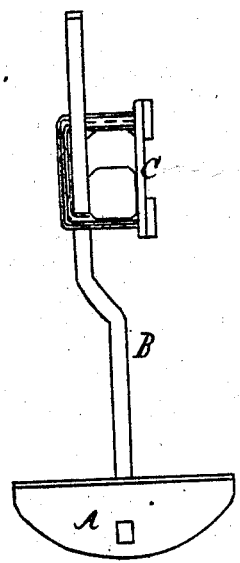

The standard is bent, as shown on Figure 2, to provide for adjusting the plough directly under and parallel with the plough-beam.

The clamp C is constructed as shown on the drawings, and is attached to the plough-beam by the use of nuts and screws, to enable me to clasp the plough-beam with great firmness, and thereby hold the standard securely in the proper position.

What I claim as my invention, and desire to secure by Letters Patent, is—

The combination and arrangement of the plough A, standard B, and clasp C, in the manner and for the purposes herein specified.

JEREMY BRADLEY.

Witnesses:
C. H. SHAW,
WM. H. KELLY.